United States Patent
Morgenstern

(10) Patent No.: US 7,933,810 B2
(45) Date of Patent: Apr. 26, 2011

(54) COLLECTIVELY GIVING GIFTS IN A SOCIAL NETWORK ENVIRONMENT

(75) Inventor: Jared Morgenstern, Menlo Park, CA (US)

(73) Assignee: Facebook, Inc., Palo Alto, CA (US)

(*) Notice: Subject to any disclaimer, the term of this patent is extended or adjusted under 35 U.S.C. 154(b) by 388 days.

(21) Appl. No.: 11/899,426

(22) Filed: Sep. 5, 2007

(65) Prior Publication Data

US 2008/0189189 A1   Aug. 7, 2008

Related U.S. Application Data

(60) Provisional application No. 60/899,121, filed on Feb. 2, 2007.

(51) Int. Cl.
*G06Q 30/00* (2006.01)
*G06F 17/30* (2006.01)

(52) U.S. Cl. ........................... 705/26.1; 705/27.1

(58) Field of Classification Search ............... 705/26–27
See application file for complete search history.

(56) References Cited

U.S. PATENT DOCUMENTS

| | | | | |
|---|---|---|---|---|
| 5,696,366 A * | 12/1997 | Ziarno | ............ | 235/380 |
| 5,937,413 A | 8/1999 | Hyun | | |
| 6,029,141 A | 2/2000 | Bezos | | |
| 6,092,052 A * | 7/2000 | Ziarno | ............ | 705/21 |
| 6,240,397 B1 * | 5/2001 | Sachs | ............ | 705/27 |
| 6,633,849 B1 * | 10/2003 | Dodd | ............ | 705/1 |
| 7,013,292 B1 | 3/2006 | Hsu | | |
| 7,249,123 B2 | 7/2007 | Elder | | |
| 7,269,590 B2 | 9/2007 | Hull | | |
| 7,343,335 B1 * | 3/2008 | Olliphant | ............ | 705/36 R |
| 7,761,344 B2 * | 7/2010 | Smith | ............ | 705/26 |
| 7,792,699 B2 * | 9/2010 | Kwei | ............ | 705/26 |
| 2001/0021920 A1 * | 9/2001 | Ikeda | ............ | 705/26 |
| 2001/0037721 A1 | 11/2001 | Hasegawa | | |
| 2002/0042775 A1 * | 4/2002 | Nelson et al. | ............ | 705/39 |
| 2002/0059201 A1 | 5/2002 | Work | | |
| 2002/0120564 A1 | 8/2002 | Strietzel | | |
| 2002/0123924 A1 * | 9/2002 | Cruz | ............ | 705/10 |
| 2003/0074265 A1 * | 4/2003 | Oshima | ............ | 705/26 |
| 2003/0145093 A1 | 7/2003 | Oren | | |
| 2003/0172004 A1 * | 9/2003 | Anderson | ............ | 705/27 |
| 2003/0222918 A1 | 12/2003 | Coulthard | | |
| 2003/0225632 A1 | 12/2003 | Tong | | |
| 2003/0233283 A1 * | 12/2003 | Shah | ............ | 705/26 |
| 2004/0024846 A1 | 2/2004 | Randall | | |
| 2004/0088177 A1 | 5/2004 | Travis | | |

(Continued)

OTHER PUBLICATIONS

"NetGift Registry Network New Multi-Site Gift Registry Network". Business Wire. Nov. 2, 1999. p. 1422, 2 pgs [recovered from Dialog on Dec. 8, 2010].*

(Continued)

*Primary Examiner* — Jeffrey A Smith
*Assistant Examiner* — Kathleen Davison
(74) *Attorney, Agent, or Firm* — Fenwick & West LLP

(57) ABSTRACT

A method for collectively purchasing a gift in a social network environment is described. A request is received to establish a gift account, a recipient user of the social network environment is designated to receive the gift, and the gift is selected. Money is received from a plurality of contributing users for deposit into the gift account, and the selected gift is purchased using the money deposited in the gift account. The purchased gift is then provided to the recipient user.

26 Claims, 12 Drawing Sheets

U.S. PATENT DOCUMENTS

| | | | |
|---|---|---|---|
| 2004/0148228 A1* | 7/2004 | Kwei | 705/26 |
| 2004/0148275 A1 | 7/2004 | Achlioptas | |
| 2005/0021750 A1 | 1/2005 | Abrams | |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1 | 9/2005 | Bezos | |
| 2005/0216300 A1 | 9/2005 | Appelman | |
| 2005/0216550 A1 | 9/2005 | Paseman | |
| 2005/0235062 A1 | 10/2005 | Lunt | |
| 2005/0256756 A1 | 11/2005 | Lam | |
| 2006/0036503 A1* | 2/2006 | Schweier et al. | 705/26 |
| 2006/0041543 A1 | 2/2006 | Achlioptas | |
| 2006/0042483 A1 | 3/2006 | Work | |
| 2006/0048059 A1 | 3/2006 | Etkin | |
| 2006/0052091 A1 | 3/2006 | Onyon | |
| 2006/0080613 A1 | 4/2006 | Savant | |
| 2006/0085419 A1 | 4/2006 | Rosen | |
| 2006/0122926 A1* | 6/2006 | Hsu et al. | 705/35 |
| 2006/0136419 A1 | 6/2006 | Brydon | |
| 2006/0143183 A1 | 6/2006 | Goldberg | |
| 2006/0161599 A1 | 7/2006 | Rosen | |
| 2006/0178946 A1* | 8/2006 | Agarwal | 705/26 |
| 2006/0184617 A1 | 8/2006 | Nicholas | |
| 2006/0190281 A1 | 8/2006 | Kott | |
| 2006/0194186 A1 | 8/2006 | Nanda | |
| 2006/0208074 A1* | 9/2006 | Eglen et al. | 235/383 |
| 2006/0218225 A1 | 9/2006 | Hee Voon | |
| 2006/0229063 A1 | 10/2006 | Koch | |
| 2006/0230061 A1 | 10/2006 | Sample | |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0293976 A1 | 12/2006 | Nam | |
| 2007/0002057 A1* | 1/2007 | Danzig et al. | 345/473 |
| 2007/0067271 A1 | 3/2007 | Lu | |
| 2007/0174389 A1 | 7/2007 | Armstrong | |
| 2007/0208627 A1* | 9/2007 | Abadi | 705/26 |
| 2007/0208916 A1 | 9/2007 | Tomita | |
| 2007/0282987 A1 | 12/2007 | Fischer | |
| 2008/0005076 A1 | 1/2008 | Payne | |
| 2008/0010343 A1 | 1/2008 | Escaffi | |
| 2008/0033776 A1 | 2/2008 | Marchese | |
| 2008/0040428 A1 | 2/2008 | Wei | |
| 2008/0070697 A1 | 3/2008 | Robinson | |
| 2008/0086458 A1 | 4/2008 | Robinson | |
| 2009/0094134 A1 | 4/2009 | Toomer et al. | |

OTHER PUBLICATIONS

U.S. Appl. No. 11/639,655, filed Dec. 14, 2006, Mark Zuckerberg, Systems and Methods for Social Mapping.

U.S. Appl. No. 11/646,206, filed Dec. 26, 2006, Aaron Sittig, Systems and Methods for Generating a Social Timeline.

U.S. Appl. No. 11/493,291, filed Jul. 25, 2006, Mark Zuckerberg, Systems and Methods for Dynamically Generating a Privacy Summary.

U.S. Appl. No. 11/701,698, filed Feb. 2, 2007, Jed Stremel, System and Method for Digital File Distribution.

U.S. Appl. No. 11/713,455, filed Feb. 28, 2007, Jed Stremel, Systems and Methods for Automatically Locating Web-Based Social Network Members.

U.S. Appl. No. 11/701,566, filed Feb. 2, 2007, Jed Stremel, System and Method for Automatic Population of a Contact File with Contact Content and Expression Content.

U.S. Appl. No. 11/502,757, filed Aug. 11, 2006, Andrew Bosworth, Systems and Methods for Generating Dynamic Relationship-Based Content Personalized for Members of a Web-Based Social Network.

U.S. Appl. No. 11/503,093, filed Aug. 11, 2006, Andrew Bosworth, Systems and Methods for Measuring User Affinity in a Social Network Environment.

U.S. Appl. No. 11/503,037, filed Aug. 11, 2006, Mark Zuckerberg, Systems and Methods for Providing Dynamically Selected Media Content to a User of an Electronic Device in a Social Network Environment.

U.S. Appl. No. 11/503,242, filed Aug. 11, 2006, Mark Zuckerberg, System and Method for Dynamically Providing a News Feed About a User of a Social Network.

U.S. Appl. No. 11/499,093, filed Aug. 2, 2006, Mark Zuckerberg, Systems and Methods for Dynamically Generating Segmented Community Flyers.

U.S. Appl. No. 11/580,210, filed Oct. 11, 2006, Mark Zuckerberg, System and Method for Tagging Digital Media.

U.S. Appl. No. 11/893,493, filed Aug. 15, 2007, Arieh Steinberg, Web-Based Social Network Badges.

U.S. Appl. No. 11/982,974, filed Nov. 5, 2007, Ruchi Sanghvi, Systems and Methods for a Web-Based Social Networking Environment Integrated Within One or More Computing and/or Networking Applications.

U.S. Appl. No. 11/701,595, filed Feb. 2, 2007, Ezra Callahan, System and Method for Determining a Trust Level in a Social Network Environment.

U.S. Appl. No. 11/726,962, filed Mar. 23, 2007, Charlie Cheever, System and Method for Confirming an Association in a Web-Based Social Network.

U.S. Appl. No. 11/701,744, filed Feb. 2, 2007, Andrew Bosworth, System and Method for Curtailing Objectionable Behavior in a Web-Based Social Network.

U.S. Appl. No. 11/796,184, filed Apr. 27, 2007, Jared S. Morgenstern, System and Method for Giving Gifts and Displaying Assets in a Social Network Environment.

U.S. Appl. No. 11/893,797, filed Aug. 16, 2007, Yun-Fang Juan, System and Method for Invitation Targeting in a Web-Based Social Network.

U.S. Appl. No. 11/893,820, filed Aug. 16, 2007, Yun-Fang Juan, Systems and Methods for Keyword Selection in a Web-Based Social Network.

U.S. Appl. No. 12/072,003, filed Feb. 21, 2008, Arieh Steinberg, Systems and Methods for Implementation of a Structured Query Language Interface in a Distributed Database Environment.

U.S. Appl. No. 12/077,070, filed Mar. 13, 2008, Dave Fetterman, Systems and Methods for Network Authentication.

U.S. Appl. No. 12/154,504, filed May 23, 2008, Adam D'Angelo, Personalized Platform for Accessing Internet Applications.

U.S. Appl. No. 12/156,091, filed May 28, 2008, Mark Zuckerberg, Systems and Methods for Auction Based Polling.

U.S. Appl. No. 12/151,734, filed May 7, 2008, Jared Morgenstern, Systems and Methods for Classified Advertising in an Authenticated Web-Based Social Network.

U.S. Appl. No. 12/154,886, filed May 27, 2008, Nico Vera, Systems and Methods for Providing Privacy Settings for Applications Associated with a User Profile.

U.S. Appl. No. 11/893,559, filed Aug. 15, 2007, Adam D'Angelo, Platform for Providing a Social Context to Software Applications.

U.S. Appl. No. 12/080,808, filed Apr. 2, 2008, Peter Deng, Systems and Methods for Calendaring.

Flores, Fernando et al. "Computer systems and the design of organizational interaction." In ACM Transactions on Information Systems (TOIS), vol. 6, Issue 2, Apr. 1988.

ChipIn. ChipIn: The easy way to collect money [online], Dec. 15, 2006 http://web.archive.org/web/20061215090739/www.chipin.com/overview.

Parzek, E. Social Networking to ChipIn to a Good Cause [online]. Business Design Studio, Jun. 29, 2006 http://www.businessdesignstudio.com/resources/blogger/2006/06social-networking-tochipin-to-good.html.

Selman, J., "FunHi.com Social Network Breaks One Millon Dollars," Business Wire, Jun. 14, 2004, p. 1.

Selman, J., "FunHi LLC Debuts New Free Social Networking Service; Innovative Features Go Far Beyond Dating and Rating; MariaClara has received virtual gift icons from admirers worth hundreds of dollars on FunHi LLC, a new free social networking service. MariaClara has the largest following on FunHi to date, she has held 1st place for several weeks against tough competition from both amateur and pro," Business Wire, Feb. 23, 2004. p. 1.

Terdiman, D., "Playas Pay to Spread the Luv," Gaming, Wired.com, Mar. 29, 2004, 3 pages, [online] [Retrieved on Jul. 8, 2010] Retrieved from the internet <URL:http://www.wired.com/gaming/gamingreviews/news/2004/03/62826?curr ...>.

"Frequently Asked Questions," FunHi, 5 pages, (Archived on web.archive.org on Dec. 13, 2005) [online] [retrieved on Jul. 8, 2010] Retrieved from the internet <URL:http://web.archive.org/web120060113150449/funhi.com/4/faqs.asp>.

"Stars of FunHi," FunHi, 5 pages, (Archived on web.archive.org on Dec. 13, 2005) [online] [retrieved on Jul. 8, 2010] Retrieved from the internet <URL:http://web.archive.org/web120051213230119/funhi.com/1/>.

"FunHi profile for wendywhlo," FunHi, 2 pages, (Archived on web.archive.org on Dec. 18, 2005) [online] [retrieved on Jul. 8, 2010] Retrieved from the internet <URL:http://web.archive.org|web120051218004334/funhi.com/1/profile~id~11...>.

"wendywhlo's FunHi Loot," FunHi, 3 pages, (Archived on web.archive.org on Feb. 11, 2006) [online] [retrieved on Jul. 8, 2010] Retrieved from the internet <URL:http://web.archive.org/web1200602110153411funhi.com/1|1 00t-id-111O.asp>.

* cited by examiner

COLLECTIVELY GIVING GIFTS IN A SOCIAL NETWORK ENVIRONMENT

CROSS-REFERENCE TO RELATED APPLICATIONS

This application claims benefit and priority of U.S. Patent Application Ser. No. 60/899,121 filed on Feb. 2, 2007, entitled "System and Method for Automatically Giving Gifts and Displaying Assets in a Social Network Environment," the specification of which is incorporated in its entirety by reference herein.

BACKGROUND OF THE INVENTION

1. Field of the Invention

The present invention relates generally to social networks, and more particularly to collectively giving a gift to a user in a social network.

2. Description of Related Art

Conventionally, a user of a networking website connects with other users by providing information about the user to a social network website for access by the other users. For example, a user may post contact information, background information, current job position, hobbies, and so forth. Information about personal events may also be posted by a user, for example on personal webpages, web logs (BLOGS), etc. Such posts may include information about the user's birthday, anniversaries, special events, gifts received, gifts given, purchases made, etc. Other users may contact the user and/or review information about the user based on common interests or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users. Even more recently, a social networking website has developed a system enabling a user of the network to purchase a gift and give the gift to another user via the social network. For example, one user may give another user a gift for the birthday of the recipient. In various embodiments, both the user who gives the gift and the user who receives the gift may be friends or members of a group in the social network. Other friends of the recipient or users within the group may also choose to give birthday gifts to the recipient. However, the value of the gifts may be limited by the resources of the individuals of the group and some of the gifts may be repetitive.

SUMMARY OF THE INVENTION

The present invention includes systems and methods for a group of users of a social network environment (e.g., Facebook) to participate in the purchase of an asset via the social network environment as a gift for a recipient user and present the gift to the recipient user. As with gifts from a group that are purchased in the conventional way, the gift may represent a relationship, and/or the quality of the relationship, between the recipient user and the group who collectively purchased the gift. The gift may also represent appreciation, esteem, or respect from the group for the recipient. In various embodiments, the gift may be given for a birthday, a baby shower, an anniversary, Christmas, graduation, etc. The group of users can collectively purchase and give a gift having many times the value of gifts that might otherwise be given individually by members of the group. In the present invention, the gift may include various types of assets including real assets, digital assets, icons or virtual assets. The asset or an icon representing the asset may be displayed to members of the group and/or social network members visiting a webpage representing the recipient user to confirm receipt of the gift. An icon representing the gift may also be displayed on the web pages of the users who participated in purchasing and giving the gift, for example, to confirm their participation.

The social network provider may participate actively or passively in providing for the purchase of the gift. For example, the social network provider may actively participate by identifying a potential recipient user and notifying friends of the recipient user in the social network environment of a pending birthday, and by suggesting a gift or list of gifts for the recipient user. The social network provider may participate passively by receiving a request from one of the friends to purchase a gift for the recipient user, receiving a selection of the gift, and receiving money from the group of friends in the social network environment for purchasing the gift. The social network provider may purchase the gift as directed by the contributing users, from a vendor using the money received from the group and provide the selected gift to the recipient user.

In some embodiments, the present invention includes a method for collectively giving a gift in a social network environment comprising receiving a request to establish a gift account, receiving an identity of a recipient user of the social network environment designated to receive the gift, receiving money from a plurality of contributing users for deposit into the gift account, receiving a gift selection, purchasing the selected gift from a vendor using the money deposited in the gift account, and providing the selected gift to the recipient user.

DETAILED DESCRIPTION

Often, a group of friends, classmates, or co-workers and so on who are connected in a social network environment may agree to collectively give a gift to someone within the group, for example, for a birthday or other special event. Typically, a member of the group collects money from the rest of the members and purchases the gift and then presents the gift to the recipient at a party or some other event. However, since the users in a social network group are often many different locations, it may be difficult for such a group to give a gift in this fashion. In the present invention, the social network provider can automate collection of money for members of the group. Moreover, since the group may not get together in a particular physical location for the party or other event the social network provider can deliver the gift to the recipient at the correct time.

Figure 1:
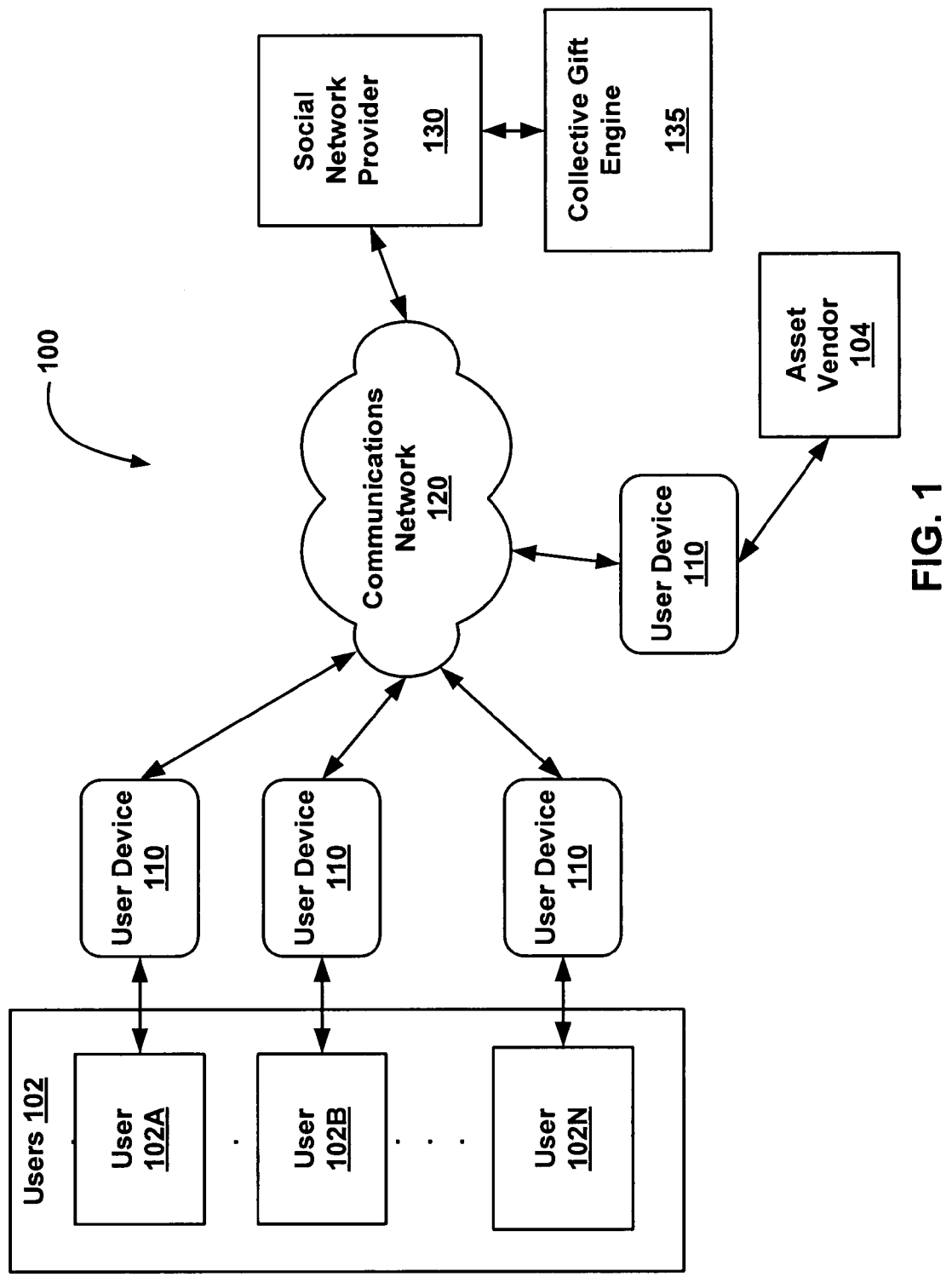
FIG. 1 illustrates an exemplary environment for collectively purchasing, giving, and displaying assets, in a social network.

FIG. 1 illustrates an exemplary environment 100 for collectively purchasing, giving, and displaying assets, in a social network. One or more users 102 (102A-102N), at user devices 110 are coupled to a social network provider 130 via a communications network 120. In various embodiments, user devices 110 may include a computer, a personal digital assistant (PDA), a wireless telephone, a digital camera, and so forth. In various embodiments, the communications network 120 may include a local area network (LAN), a wide area network (WAN), a wireless network, an intranet, the Internet, and etc. The users 102 may have different roles; for example, there may be a requesting user 102A who requests and/or organizes a purchase of an asset as a gift via the social network environment 100, two or more contributing users 102C acting as a group within the social network environment 100 to purchase the gift, and a recipient user 102B who receives the gift from the contributing users 102C. In some embodiments, a requesting user 102A is also a contributing user. The network environment 100 further includes an asset vendor 104 who provides an asset to another user 102 or the social network environment 100.

The social network provider 130 is an entity or person that provides social networking services, communication services, dating services, company intranets, and/or online games, etc. For example, the social network provider 130 may host a website that allows one or more users 102 at one or more user devices 110 to communicate with one another via the communications network 120. The social network environment 100 may offer a user 102 an opportunity to connect with one or more other users 102 who have attended, for example, the same university. In some embodiments, a social network environment 100 includes a segmented community, such as a separate, exclusive or semi-exclusive subset of the social network environment 100, or social network environment 100 wherein only users 102 who are authenticated segmented community members may access and interact with other members of their respective segmented community. According to various embodiments, one or more social networks, i.e., groupings of users, are provided for each user 102 within the social network environment 100. Examples of such groupings are set forth in further detail in U.S. patent application Ser. No. 11/369,655.

In various embodiments, the requesting user 102A may select an asset such as a real asset, a digital asset, and/or a virtual asset to purchase as a gift for a recipient user. In some embodiments the two or more contributing users 102C may select the asset. A real asset includes tangible goods such as a personal digital assistant (PDA), a digital audio player, an article of clothing, a vehicle, etc. In various embodiments, digital assets include digital images, digital video, digital audio, digital audiovisual media, digital text, digital books, online game icons, online game avatars, etc.

Various examples of a virtual asset include an online game asset (e.g., an avatar, game money, an in-game object, a music file, a game life, game health, game power, etc.), a movie pass, an online redemption coupon, credit, an online gift certificate, an airline e-ticket, etc. Another example of a virtual asset is an indication of a level of achievement (e.g., a skill level in a game, an accumulation of friends in a social network environment 100, airline miles, number of movies rented, number of books read at a library, number of nights at a hotel, etc.) As is well known such virtual assets are regularly bought and sold, for example airline miles, or skill levels in a game. An icon may have properties of a virtual asset or a digital asset. An icon may represent a digital asset and/or a real asset owned by a user 102.

The asset vendor 104 provides assets for purchase by users 102. The asset vendor 104 may be a user 102D within the social network environment 100, or may be a non-user outside the social network environment 100. The social network provider 130 may also be an asset vendor. The asset vendor may be coupled to the social network provider 130 at a user device 110 via the communications network 120. In some embodiments, an asset vendor 104 can communicate directly with the social network provider 130. The social network provider 130 may receive a fee for the connecting the users 102 with the asset vendor 104 and/or for a purchase of an asset. The fee may be received from the contributing users 102C and/or from the asset vendor 104. In some embodiments, the fee is received from an advertiser for advertising attached to an asset purchased and displayed via the social network environment 100. The fee may be any amount, for example based on a percentage of the purchase, a flat rate, a combination of flat rate plus percentage, profit, display time, number of hits, etc.

The social network environment 100 further includes a collective gift engine 135. The collective gift engine 135 is configured to facilitate purchase of an asset on behalf of the contributing users 102C, for transfer to a recipient user 102B as a gift. When the gift is a digital asset, the collective gift engine 135 may display the digital asset or an icon representing an asset. The icon and/or a digital asset represented by the icon may be displayed on a webpage belonging to recipient user 102B and made visible to other users 102, for example the contributing users 102C. In some embodiments, the collective gift engine 135 displays only an asset or an icon representing an asset that has been purchased via the social network provider 130.

Figure 2:
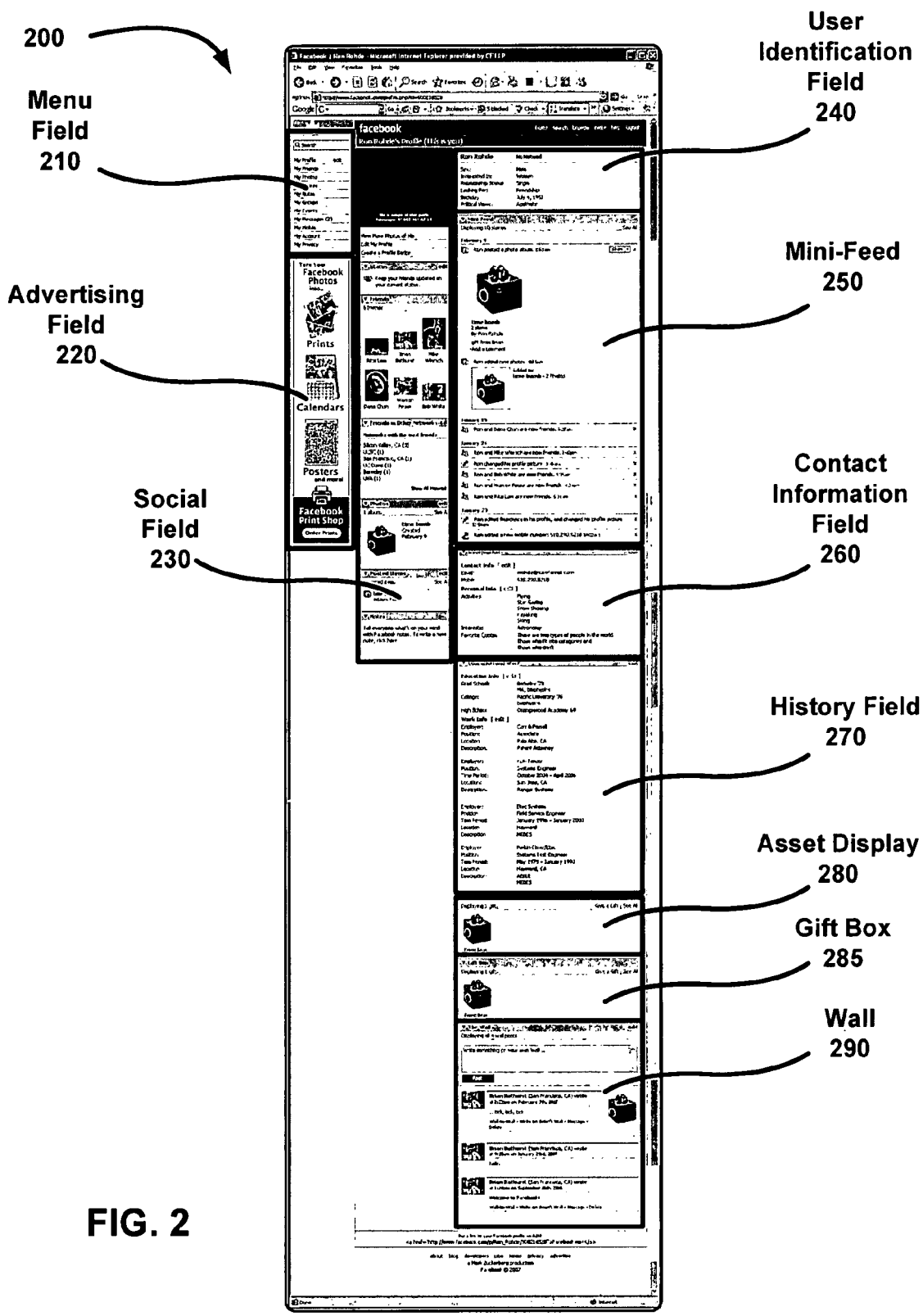
FIG. 2 is a screen shot of an exemplary profile representing a user in the social network environment of FIG. 1.

Referring now to FIG. 2, a screen shot of an exemplary profile 200, representing a user 102 in the social network environment 100 of FIG. 1, is shown. The profile 200 may occupy an entire web page or a portion of a webpage in the social network environment 100. The profile 200 includes various fields relating to the user 102. Fields in the profile 200 illustrated in FIG. 2 include a menu field 210, an advertising field 220, a social field 230, a user identification field 240, a mini-feed display 250, a contact information field 260, a history field 270, an asset display 280, a giftbox 285, and a wall 290. However, fewer or more fields may comprise the profile 200 and still fall within the scope of various embodiments.

As illustrated in FIG. 2, the menu field 210 includes links to various webpages such as links to friends, photos, shares, notes, groups, events, messages, mobile, account, privacy, and/or other webpages. It may be appreciated that additional links may be provided to the user 102 and that some of the links listed in the above example may be omitted. The advertising field 220 provides the social network provider 130 a space to present advertising to the user.

The social field 230 illustrated in FIG. 2 includes an image of the user 102 and information regarding the user 102, such as a status, a list of friends, a list of photo albums posted by the user 102, a list of items, gifts, photos and other posts by the user 102, and notes displayed by the user 102, as described in U.S. patent application Ser. No. 11/502,757, and U.S. patent application Ser. No. 11/580,210.

The user identification field 240 may include further information regarding the user 102, for example, personal statistics, such as, name, gender, birth date, age, interests, etc. The mini-feed display 250 presents short news clips relating to the user 102, such as those described in U.S. patent application Ser. No. 11/503,242. The contact information field 260 includes various types of contact and personal information such as phone numbers, hobbies, etc. The history field 270 includes information regarding high schools, colleges, universities, attended, as well as companies where the user has worked.

The asset display 280 may display digital assets purchased and/or acquired by a user 102. The giftbox 285 may display digital assets received as gifts by a recipient user 102B, e.g., from one or more contributing users 102C. A gift displayed in the gift box 285 may also be displayed in the asset display 280. In some embodiments, the identity of one or more of the contributing users 102C, and/or messages from the contributing users 102C may be posted in the giftbox with the gift. Optionally, the giftbox 285 includes icons that provide links to other webpages.

The wall 290 displays information and comments posted to the profile 200 by various users 102. An icon representing a gift received from a user 102 may be posted to the wall 290 along with comments or messages from the user 102. In some embodiments the icon posted to the wall 290 may represent a digital gift appearing in the giftbox 285 that has been received from one or more contributing users 102C.

The profile 200 depicted in FIG. 2 has been assembled from a composite of several screen shots for illustration purposes. In general use, a user 102 may scroll up or down to view various portions of the profile webpage. In some embodiments, the entries described in one field may instead be found in another field. For example, an entry described as being displayed in the wall 290 may be found instead in the social field 230. Some entries may be found in more than one field. For example, an icon representing a gift may be found in an entry in a mini-feed display 250, the wall 290, and the social field 230. Some entries illustrated in FIG. 2 may be omitted and/or additional entries may be included.

Figure 3:
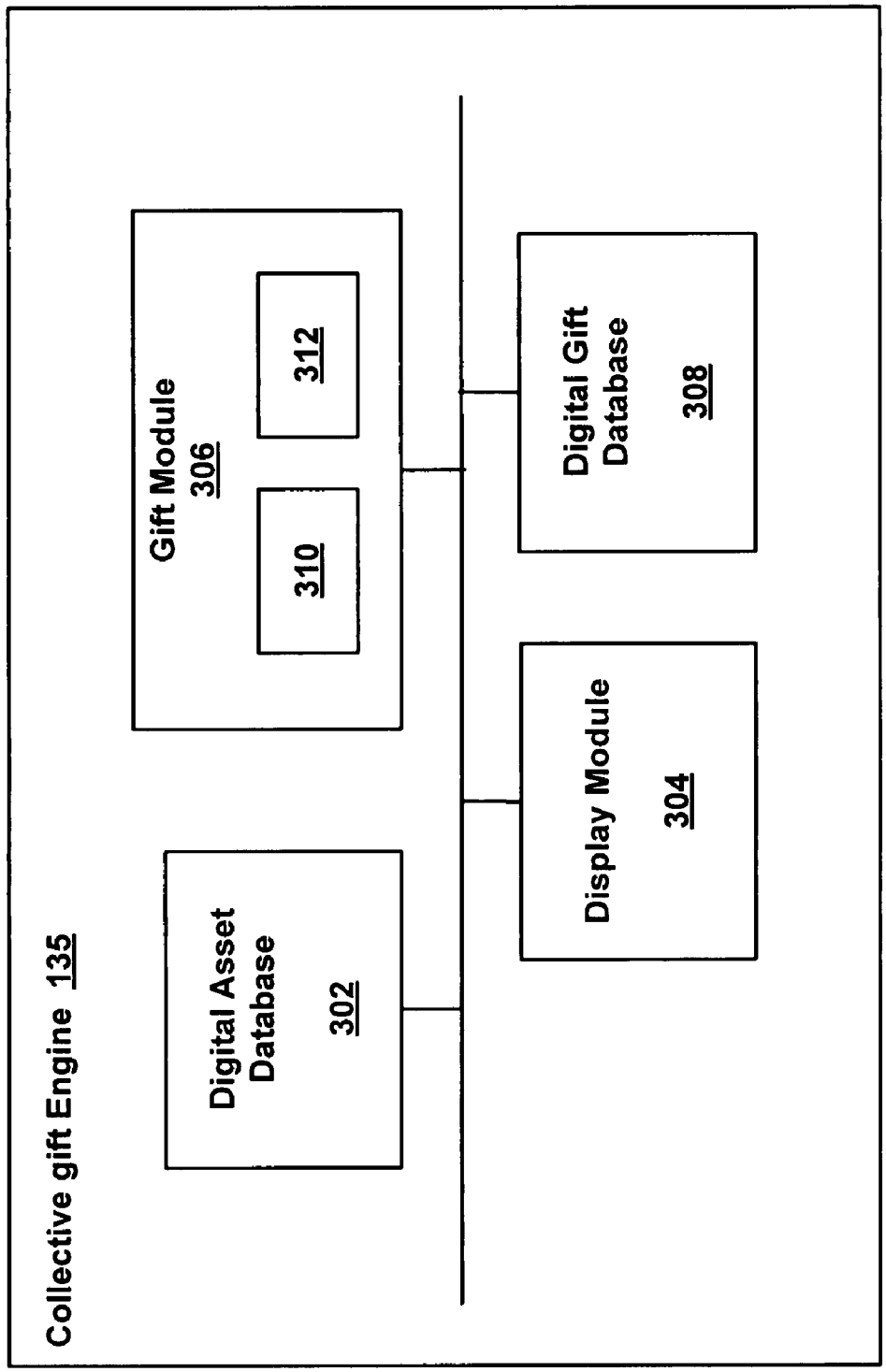
FIG. 3 is a block diagram of an exemplary collective gift engine.

FIG. 3 is a block diagram of an exemplary collective gift engine 135. The collective gift engine 135 is configured to provide the contributing users 102C with services for acquiring an asset and giving an asset as a gift. The Collective gift engine 135 is further configured for displaying an icon representing the asset within the social network environment 100. The collective gift engine 135 includes an asset database 302, a display module 304, a gift module 306 having a given gift database 310 and a collective gift fund 312, and a digital gift database 308.

The asset database 302 is configured to store a digital asset, for example a photo or an icon. The asset database 302 is further configured to store information about an asset, such as the digital asset, a virtual asset, or a real asset for a user 102 who owns the asset, for example a recipient user 102B who received the asset as a gift. Information about the asset may include an associated icon for representing the asset, the identities of contributing users 102C who purchased the asset, the amount contributed by each contributing user 102C, date received, the identity of the asset vendor 104, etc. In some embodiments, the asset database 302 may be consulted to verify that a recipient user 102B received a particular asset as a gift from a group of contributing users 102C thus providing assurance for the group of contributing users 102C that the gift was delivered.

The display module 304 is configured to display digital assets and/or icons representing assets that are in the asset database 302, including icons representing assets acquired as gifts. The icons and/or digital assets may be displayed on a webpage belonging to the recipient user 102B, for example, the user's profile 200. The display module 304 may display a gift in a region of the profile 200 reserved for displaying gifts, for example the giftbox 285. Alternately, one or more digital assets may appear in one or more separate webpages reserved for displaying gifts and/or purchases.

In some embodiments, the social network provider 130 may automatically send out a notice of an event, such as a birthday, to friends of a recipient user 102B via the gift module 306. The social network provider 130 may use information about recipient user 102B found in various databases to determine when to send out the notices. Alternatively, social network provider 130 may send out a notice to members of groups to which the recipient user 102B belongs, for example, "The Beach Blanket Bar B Q Society." The notice may include an invitation to participate in collectively purchasing a gift for the recipient user 102B. The notice can also include a suggestion list of assets to select from. The suggestion list can be based on information about the recipient user 102B such as Affinity information, as described in U.S. patent application Ser. No. 11/503,093. Asset vendors 104 may pay for inclusion of their assets in the suggestion list. The gift module 306 may also calculate an estimated share for each contributing user 102C based on information such as the number of contributing users 102C, the cost of the asset, etc. The gift module 306 may provide the estimated share for each asset in the list. Alternatively, each contributing user 102C may determine independently an amount to contribute.

The display module 304 may display an icon representing gifts in various fields of the profile 200, including the social field 230, the mini feed display 250, the wall 290, etc. The display of icons representing gifts may be subject to privacy settings. For example, one or more of the contributing users 102C may elect to remain anonymous. Alternatively, one or more of the contributing users 102C may elect not to permit the amount contributed to be displayed. In some embodiments, icons may be displayed in separate webpages.

The gift module 306 is configured to receive a request from a requesting user 102A to purchase a gift for a recipient user 102B. The gift module 306 may receive money from two or more contributing users 102C and facilitate purchase of the gift for the recipient user 102B using the received money. In some embodiments, the gift module 306 may provide the purchased gift, e.g., a digital asset, directly to the recipient user 102B. Alternatively, an asset vendor 104 can be directed to deliver a real asset to the recipient user 102B.

In some embodiments, the requesting user 102A may provide a list of users 102 who wish to be contributing users 102C to the gift module 306. For example, the list may include friends of the recipient user 102B as contributing users 102C. Alternatively, the list may include members of a specific group, for example, "The Beach Blanket Bar B Q Society" as the contributing users 102C. In some embodiments, the contributing users 102C can include a combination of one or more groups and/or friends of the recipient user 102B. The gift module 306 may notify the contributing users 102C of the collective gift request.

Alternatively, the gift module may automatically send invitations to a list of users 102 provided by the requesting user 102A. Each of the users 102 on the invitation list may return an affirmative response or negative response. An example of an affirmative response includes contributing money. An example of a negative response includes ignoring the invitation or some other action that indicates a desire not to participate.

In some embodiments, the social network provider 130 may automatically suggest a list of assets to the requesting user 102A for selection as a gift. Alternatively, the requesting user 102A may request a suggestion list from the social network provider 130. The requesting user 102A may select one or more of the assets in the suggestion list as a selected gift for the recipient user 102B. In some embodiments, the requesting user 102A may browse a gift store webpage to select the asset, or bid in an auction within the social network environment 100 for the asset. The contributing users 102C may be given an option to approve the requesting user's 102A choice of selected gift. Alternatively, the contributing users 102C may vote on the assets in the suggestion list with the asset receiving the most votes being selected as the gift. The votes may also be weighted according to an amount contributed by respective contributing users 102C. Information and/or statistics regarding voting for assets may be collected and sold to asset vendors 104, marketing enterprises, manufacturers, etc.

The given gift database 310 can store information about gifts that are given by the contributing users 102C to a recipient user 102B. Examples of stored information include the gift ID, a bar code number also known as the stock keeping unit (SKU) of the gift, the identities of the contributing users 102C, the amount contributed by the contributing users 102C, the identity of the recipient user 102B, messages that have been attached to the gift, and so forth. When the gift is a digital asset, the display module 304 can cross reference information in the given gift database 310 with entries in the digital gift database 308 (described below) to determine the filename of the file containing the digital image and display the image on the profile 200 of the recipient user 102B. Information about gifts in the given gift database 310 may also be stored in other modules, for example, the asset database 302.

The collective gift fund 312 is configured to store money received from the contributing users 102C. Money can be transferred electronically from a contributing user 102C to the collective gift fund 312. Alternatively, the gift module may receive credit card information from a contributing user 102C and deposit money into the collective gift fund 312. In some embodiments, the gift module 306 will accept money from contributing users 102C until the amount of money in the collective gift fund 312 is sufficient to purchase the selected gift. The gift module 306 may then automatically purchase the selected gift on behalf of the group and notify the contributing users 102C. Alternatively, the gift module 306 may receive money from the contributing users 102C for a predetermined period of time. When the predetermined period of time has elapsed, the gift module 306 may automatically purchase the most valuable asset in the list of assets using the money in the collective gift fund 312 on behalf of the group and notify the contributing users 102C. The end of the predetermined period of time may be based on the date of an event. For example, the predetermined period of time may end two days before the birthday of the recipient user 102B.

In some embodiments the gift module 306 may maintain a collective gift fund 312 for each user 102. Any user 102 may become a contributing user 102C by contributing money to the collective gift fund 312 of a particular recipient user 102B at any time.

In some embodiments, the requesting user 102A and/or one or more contributing users 102C may provide text (for example, a greeting, a message, etc.) to the gift module 306 to be attached to the gift. In some embodiments, the gift module 306 may provide information regarding the gift to a news feed or a mini-feed. See, e.g., U.S. patent application Ser. No. 11/503,242.

When the selected gift is a real asset, for example, a bouquet of a dozen roses, the gift module 306 may transfer an icon representing a selected bouquet to the asset database 302 of the recipient user 102B and the display module 304 may display the icon for various other contributing users 102C to view. The recipient user 102B and the contributing users 102C may click on the icon to view information about the gift such as the identities of the contributing users 102C who gave the gift, the type of gift, images, delivery date, the event for which the gift was given, etc. The gift module 306 may provide such information to a mini-feed display 250. The gift module may also participate in purchasing the roses from an asset vendor 104 and in arranging for delivery to the recipient user 102B.

In some embodiments, the contributing users 102C may select a virtual asset to give to the recipient user 102B. The gift module 306 may transfer the virtual asset and an icon representing virtual asset to the asset database 302 of the recipient user 102B and the display module 304 may display the icon on the recipient user's 102B webpage as well as provide information regarding the gift to a news feed or mini-feed.

A digital or virtual gift may expire after a predetermined time and the gift module 306 may be configured to remove the expired digital gift and any associated icon from the asset database 302.

The digital gift database 308 includes a table that has information regarding digital assets available as gifts via the social network provider 130. In one embodiment, the table includes rows, each containing entries corresponding to gift information, for example, a gift ID, and a file name of a stored digital asset, such as a digital image.

Although the collective gift engine 135 is described as being comprised of various components (e.g., the asset database 302, the display module 304, the gift module 306, and the digital gift database 308), fewer or more components may comprise the collective gift engine 135 and still fall within the scope of various embodiments.

Figure 4:
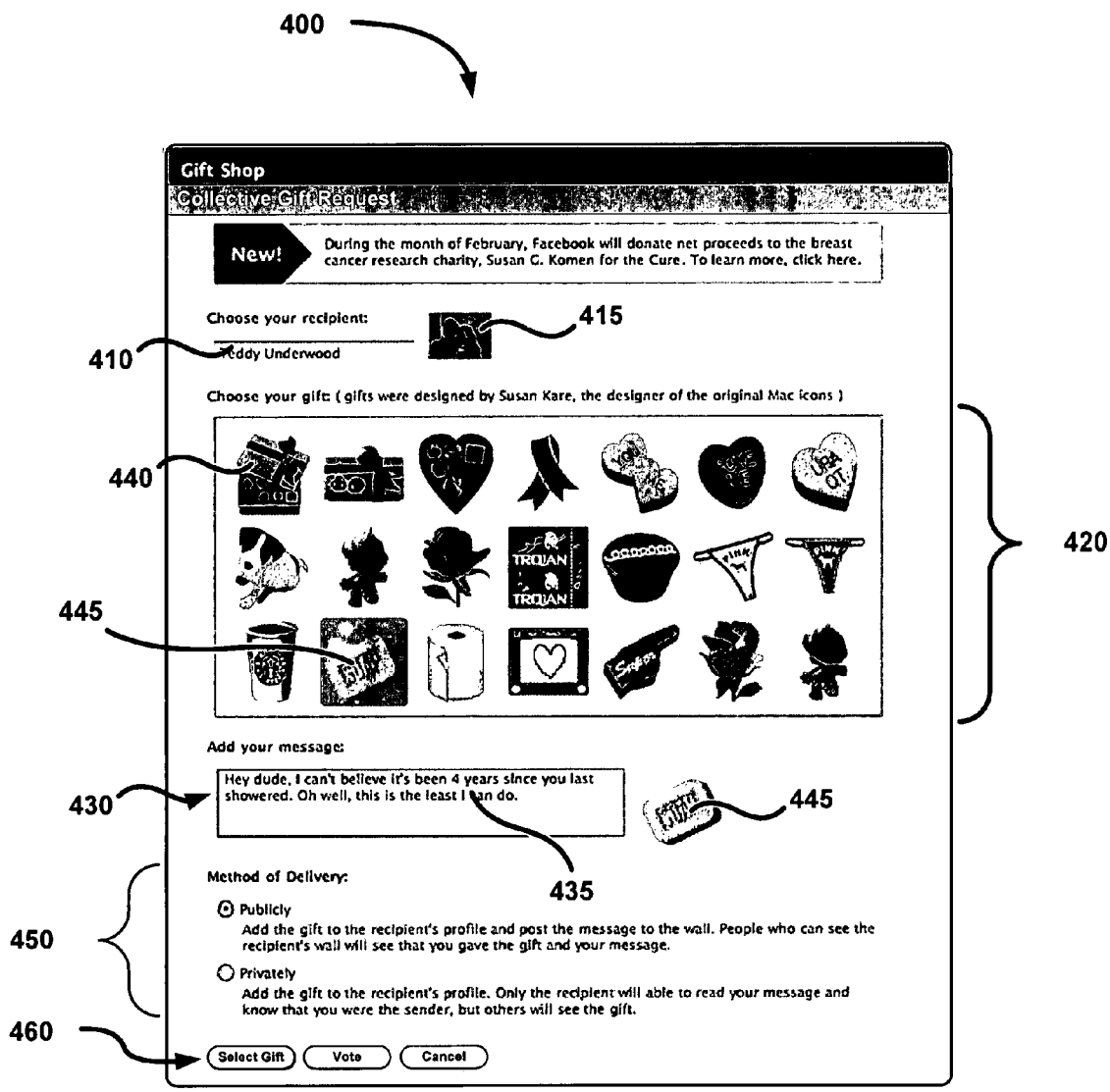
FIG. 4 is an exemplary screen shot of a gift selection display window.

FIG. 4 is an exemplary screen shot of a gift selection display window 400. The gift selection display window 400 may be used by the requesting user 102A or one or more contributing users 102C for selecting a gift for the recipient user 102B. The gift selection display window 400 includes a recipient window 410, a gift display window 420, a message window 430, privacy buttons 450, and decision buttons 460. The recipient window 410 is configured to receive an identity of a recipient user 102B from the requesting user 102A. The requesting user 102A enters a name of the recipient user 102B and the gift module 306 verifies the recipient user 102B as a member of the social network environment 100. The recipient window 410 may be locked for a contributing user 102C and thus, not enable a contributing user 102C to select or change the recipient user 102B. The gift module 306 may display an image of the recipient user 102B in an image window 415.

The gift selection display window 400 further includes images of an assortment of gifts 440 in the gift display window 420. As illustrated here, a gift 445 is highlighted in the gift display window 420, indicating that the gift 445 has been selected. The gift 445 illustrated in this particular example is a digital asset. However, in some embodiments, the gift display window 420 may display icons representing gifts that are real assets, such an IPOD, or virtual gifts, such as a movie pass. The message window 430 is configured to receive a text message 435 to attach to the gift 445.

The privacy buttons 450 are configured to permit one or more contributing users 102C to select a method for delivery of the gift 445, i.e., "Publicly" or "Privately." For example, when the gift 445 is delivered "Publicly" the gift may be added to a profile 200 belonging to the recipient user 102B upon delivery, and the text message 435 in the message window 430 may be posted to the wall 290 in the profile 200 for other contributing users 102C to read. Alternatively, when the gift 445 is delivered "Privately" to the profile 200 for the recipient user 102B, the text message 435 in the message window 430 may be visible only to the recipient user 102B. In various embodiments, additional privacy buttons 450 may lead to withhold the name of a contributing user 102C from a list of contributing users 102C, withholding information regarding an amount contributed by one or more contributing users 102C, hiding the gift 445 from all but the recipient user 102B, etc. For example, the privacy buttons 450 can include an "Anonymous(ly)" button (not illustrated) which gives the contributing user 102C an additional option to give the gift 445 to the recipient user 102B anonymously.

The decision buttons 460 include various selections such as a "Select Gift" button or a "Vote" button. The "Select Gift" button allows the requesting user 102A and/or one or more of the contributing users 102C to select a highlighted gift. One or more gifts may be highlighted and selected using the "Select Gift" button. For example, the requesting user 102A may select ten gifts for consideration of the contributing users 102C. Alternatively, the contributing users 102C may select one or more gifts to add to a list of gifts for consideration of other contributing users 102C. A list of gifts in a range of prices may be selected and a gift on the list may be purchased based on the amount of money contributed.

The "Vote" button allows the contributing user 102C to vote for one or more highlighted gifts. The decision buttons 460 may include other buttons, such as a "Cancel" button, etc. The "Select Gift" button and/or the "Vote" button may be disabled or grayed out for contributing users 102C and/or the requesting user 102A. In some embodiments, additional information (not illustrated) may be displayed in the gift selection display window 400 regarding the selected gift 445, such as price, number of votes for the gift, identity of voters for the gift, and so forth.

Although the gift selection display window 400 is described as being comprised of various components, fewer or more components may comprise the gift selection display window 400 and still fall within the scope of various embodiments.

Figure 5:
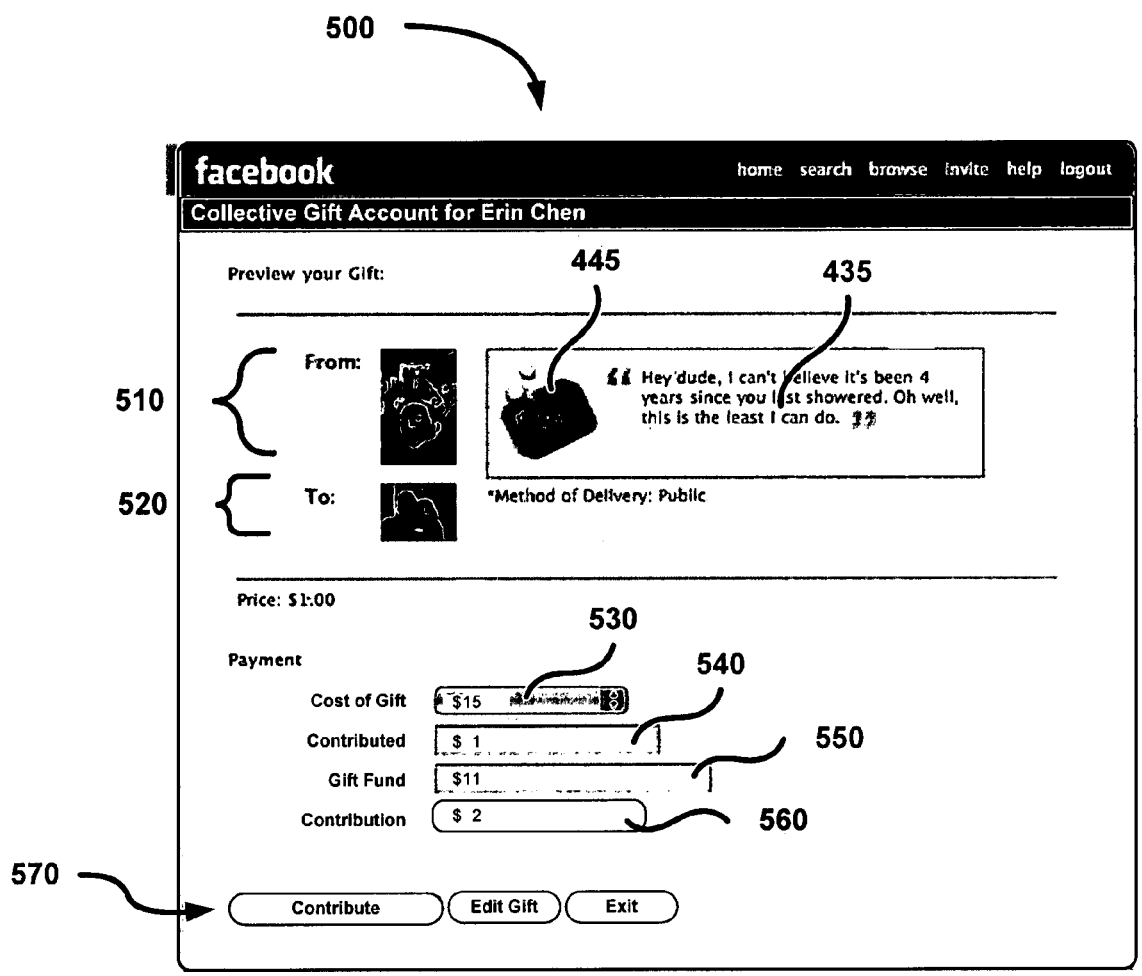
FIG. 5 is an exemplary screen shot of a collective gift account window for a contributing user.

FIG. 5 is an exemplary screen shot of a collective gift account window 500 for a contributing user 102C. The collective gift account window 500 includes a "From" window 510 and a "To" window 520, plus a "Cost of Gift" field 530, a "Contributed" field 540, a "Gift Fund" field 550, a "Contribution" field 560, and decision buttons 570. The "From" window 510 as illustrated in FIG. 5 includes the digital gift 445 and accompanying text message 435, if the gift has been selected and a message entered. Alternatively, the "From" window 510 may display an icon. The "Cost of Gift" field 530 is configured to display the cost of a selected gift. Alternatively, the "Cost of Gift" field 530 may display a proposed or agreed amount to be used for purchasing a gift.

The "Contributed" field 540 is configured to display the amount of money contributed by the specific contributing user 102C who is logged in and thus presumably viewing the screen. Alternatively, the "Contributed" field 540 may display a suggested share or amount for the contributing user 102C to contribute. The "Gift Fund" field 550 displays the total amount contributed by all contributing users 102C for purchasing the gift. The "Contribution" field 560 is configured to receive a contribution value and add that amount to both the "Contributed" field 540 and the "Gift Fund" field 550. The amount contributed may also be removed from the contributing user's 102C account, e.g., credit card account, social network account, checking account, debit card account, savings account, social network account, etc. Additional information may be displayed in the collective gift account window 500. For example, a timer may be displayed to indicate the amount of time left to make a contribution. A list of gifts costing the same as or less than the amount contributed may be displayed.

The decision buttons 570 may include selections that enable the contributing user 102C to "Contribute" or "Edit Gift." If the contributing user 102C wishes to contribute the amount in the "Contribution" field 560, the "Contribute" button may be selected from the decision buttons 570 to complete the contribution. Additional or increased contributions to the gift fund may be made by the contributing user 102C. For example, the $2 in the "Contribution" field 560 may indicate that the total amount contributed by the contributing user 102C will be $2 when the "Contribute" button is selected in the decision buttons 570. Alternatively, the $2 in the "Contribution" field 560 may indicate that the contribution from the contributing user 102C will be increased by $2 to a total of $3 when the "Contribute" button is selected in the decision buttons 570. The contributing user 102C may contribute to the gift fund multiple times before and/or after gift selection.

The contributing user 102C may select the "Edit Gift" button and the gift module 306 may return the contributing user 102C to the gift selection display window 400. The decision buttons 570 may include additional or other selections, for example, a pay button, vote button, etc. Although the collective gift account window 500 is described as being comprised of various components, fewer or more components may comprise the collective gift account window 500 and still fall within the scope of various embodiments.

Figure 6:
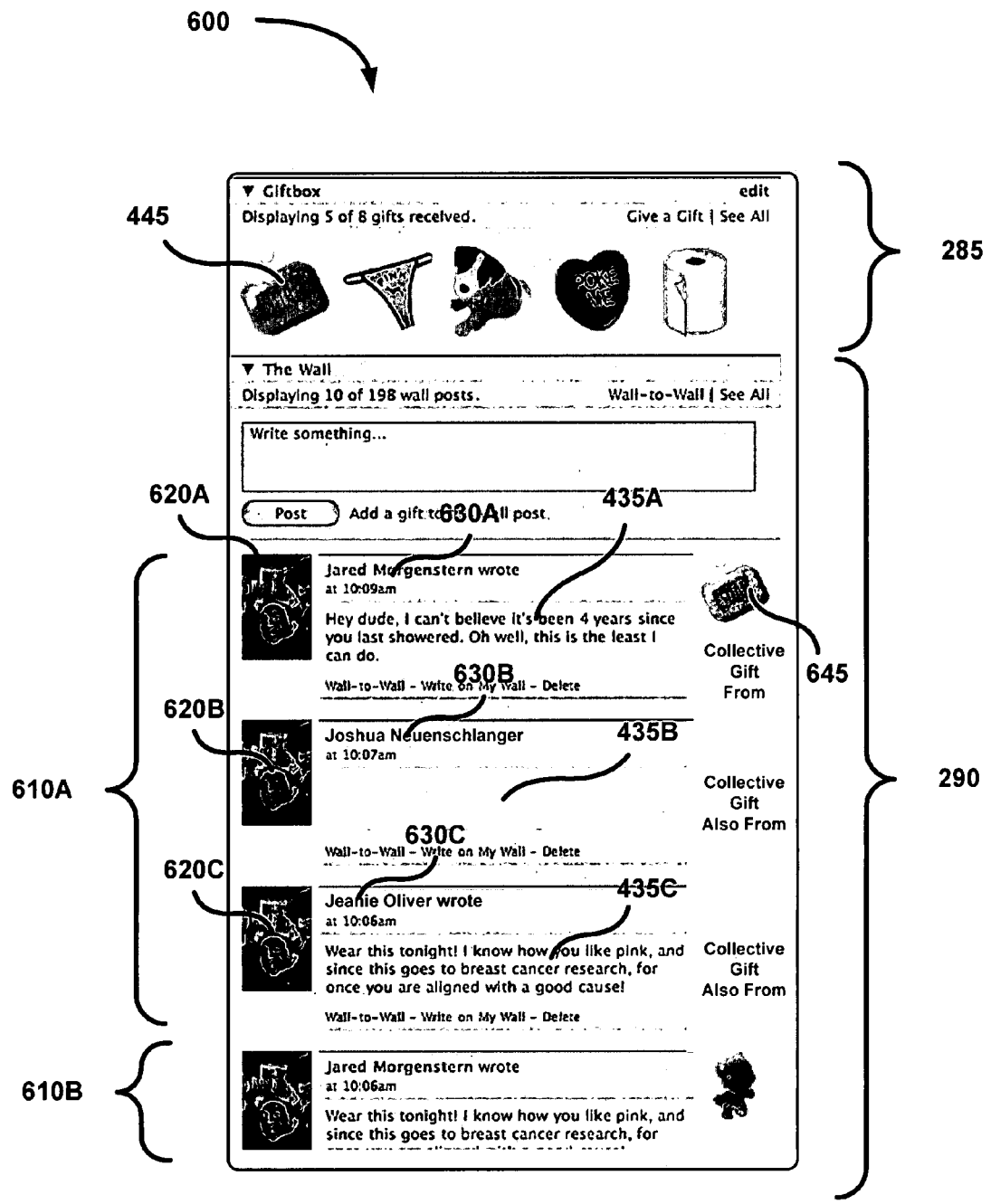
FIG. 6 is an exemplary screen shot of a portion of the profile of FIG. 2 including a giftbox and a wall.

FIG. 6 is an exemplary screen shot of a portion 600 of the profile 200 of FIG. 2 including a giftbox 285 and a wall 290. The display module 304 may display gifts received by the recipient user 102B in the giftbox 285. For example, the gift 445 is shown in the giftbox 285 of FIG. 6. The display module 304 may display multiple gifts and/or icons representing gifts in the giftbox 285.

The wall 290 may include posts 610, namely posts 610A-610B. Post 610A indicates a collective gift received by a recipient user 102B from three contributing users 102C, and post 610B indicates a non-collective gift received from one contributing user 102C. The post 610A illustrates three user icons 620A-C representing three contributing users 102C. The post 610A further includes three user names 630A-C associated with the user icons 620 for identifying contributing users 102C. The post 610A further includes three text messages 435A-C accompanying the gift 445. A contributing user 102C may elect to post a blank text message 435, e.g., message 435B. The post 610A further includes an optional gift icon 645 representing the collective gift 445. A post 610 may include fewer or more user icons 620 representing contributing users 102C than the three illustrated in post 610A. The wall 290 may include multiple posts 610 or no posts 610. The posts 610 may include items other than gifts. Although the giftbox 285 and the wall 290 illustrated in the portion 600 of the profile 200 are described as being comprised of various components, fewer or more components may comprise the portion 600 of the profile 200 and still fall within the scope of various embodiments.

Figure 7:
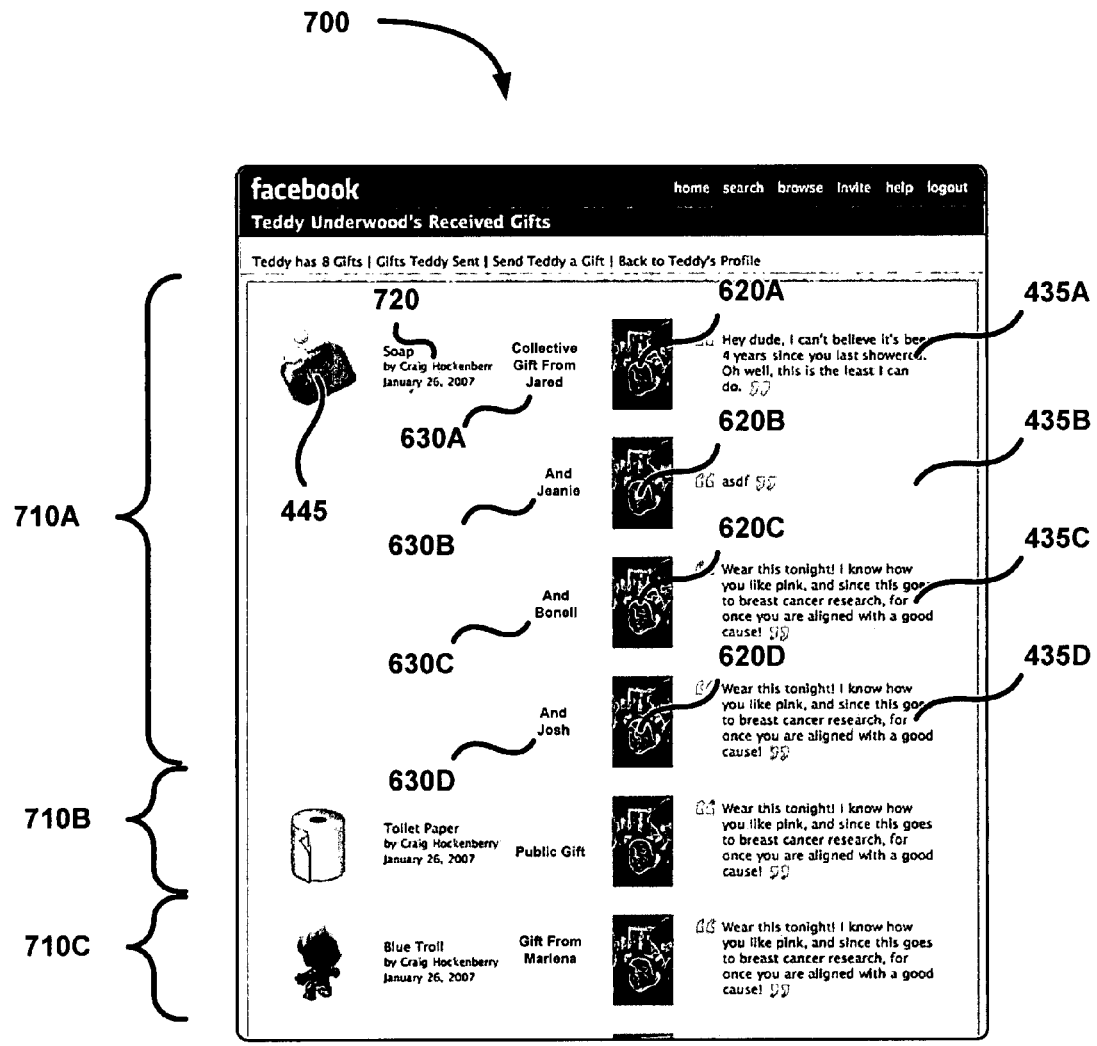
FIG. 7 is an exemplary screen shot of a received gift webpage.

FIG. 7 is an exemplary screen shot of a received gift webpage 700. The received gift webpage 700 may be reached via a link in the menu field 210 in the profile 200. The received gift webpage 700 includes one or more gift entries 710A-C. A gift entry 710A represents a collective gift received by a recipient user 102B while gift entries 710B-C represent non-collective gifts. The display module 304 may display a gift, for example, the gift 445 in the gift entry 710A. The gift entry 710A illustrates four user icons 620A-D representing four contributing users 102C, and contains four user names 630A-D accompanying the user icons 620 for identifying the contributing users 102C. The gift entry 710A further includes four text messages 435A-D accompanying the gift 445 from contributing users 102C identified by the user names 630A-630D respectively. A contributing user 102C may elect to submit a blank text message 435, e.g., message 435B. The gift entry 710A further includes optional gift information 720 providing information about the gift, e.g., the date the gift was received, the designer of the gift, the title of the gift, etc. A gift entry 710 may include fewer or more user icons 620 representing contributing users 102C than the four illustrated in gift entry 710A. The received gift webpage 700 may include multiple gift entries 710 or no gift entries 710. Although the received gift webpage 700 is described as being comprised of various components, fewer or more components may comprise the received gift webpage 700 and still fall within the scope of various embodiments.

Figure 8:
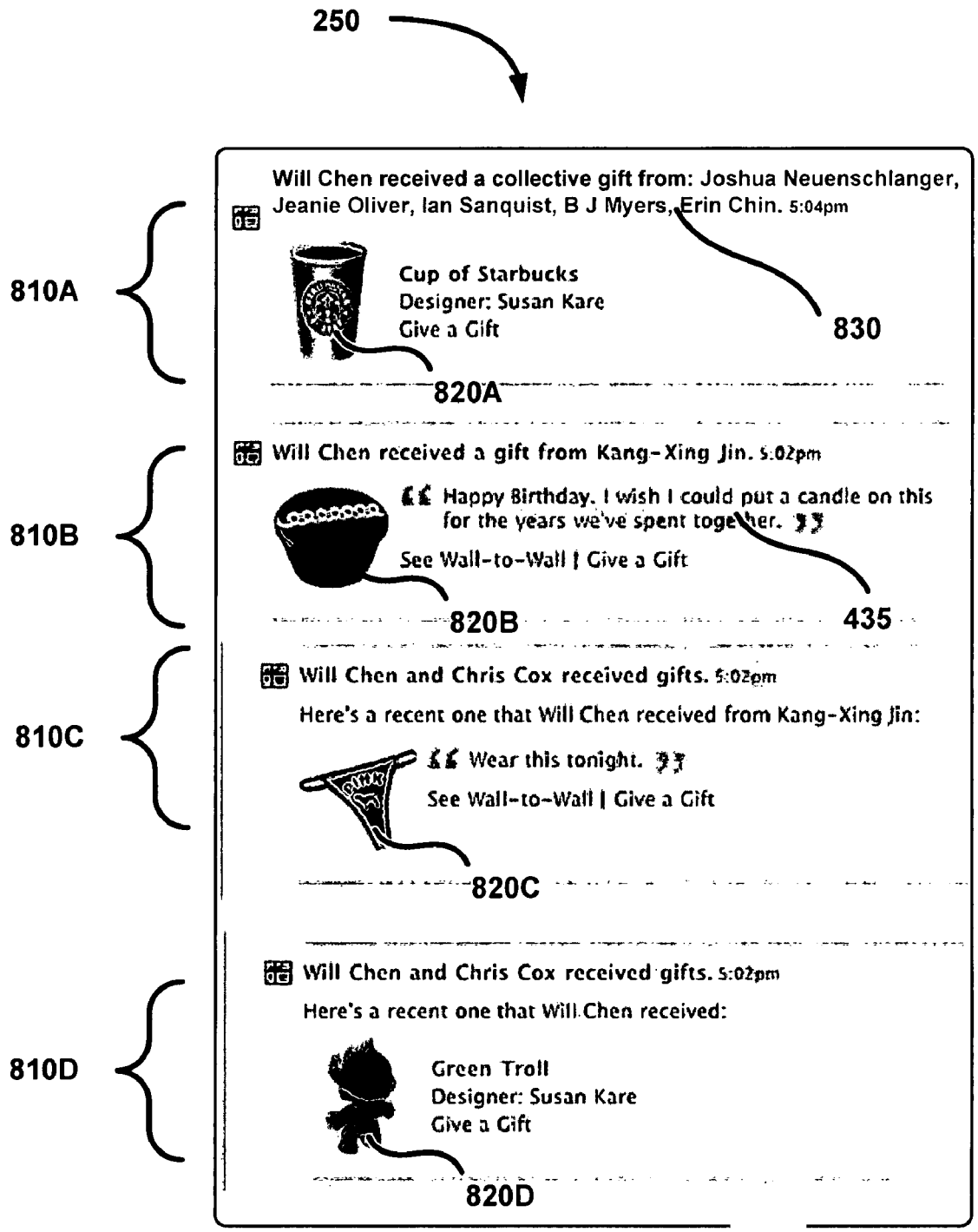
FIG. 8 is an exemplary screen shot of a mini-feed display from the profile for a recipient user.

FIG. 8 is an exemplary screen shot of a mini-feed display 250 from the profile 200 for a recipient user 102B. The mini-feed display 250 as illustrated in FIG. 8 includes four news items 810A-D. The mini-feed display 250 may include additional news items 810 or no news items 810. The display module 304 may display icons 820A-D representing gifts in the news items 810A-810D, respectively. Alternatively, the display module 304 may display digital assets (not illustrated) instead of the icons 820A-D. The news items 810A-D in the mini-feed display 250 may include news about subjects other than gifts. The news items 810A-D may further include a text message, for example the text message 435, accompanying the icon 820B as shown in the news item 810B. The news item 810A displays news about a collective gift received by the recipient user 102B. The news item 810A further displays a list 830 of names of contributing users 102C. Although the mini-feed display 250 is described as being comprised of various components, fewer or more components may comprise the mini-feed display 250 and still fall within the scope of various embodiments.

Figure 9:
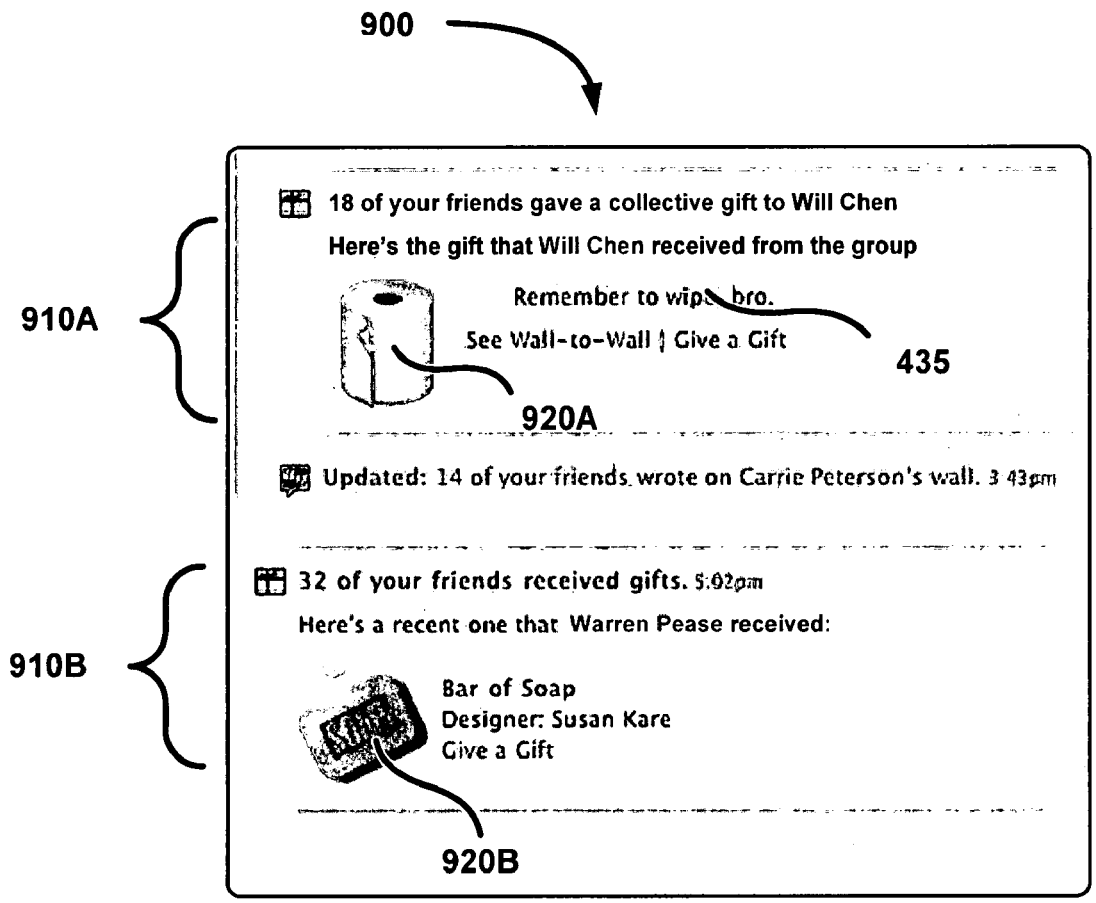
FIG. 9 is an exemplary screen shot of a news feed display for a user.

FIG. 9 is an exemplary screen shot of a news feed display 900 for a user 102. The news feed display 900 as illustrated in FIG. 9 includes two news items 910A-B and two icons 920A-B representing gifts respectively. The news item 910A discloses that a recipient user 102B, namely Will Chen, has received a collective gift from 18 friends of the user 102 who is logged in. The news item 910B discloses that a recipient user 102B, namely Warren Pease who is a friend of the logged in user received a non-collective gift. The news feed display 900 may include additional news items 910 or no news items 910. In various embodiments, the news feed display 900 can be a portion of a home page, or another webpage. Although the news feed display 900 is described as being comprised of various components, fewer or more components may comprise the news feed display 900 and still fall within the scope of various embodiments.

Figure 10:
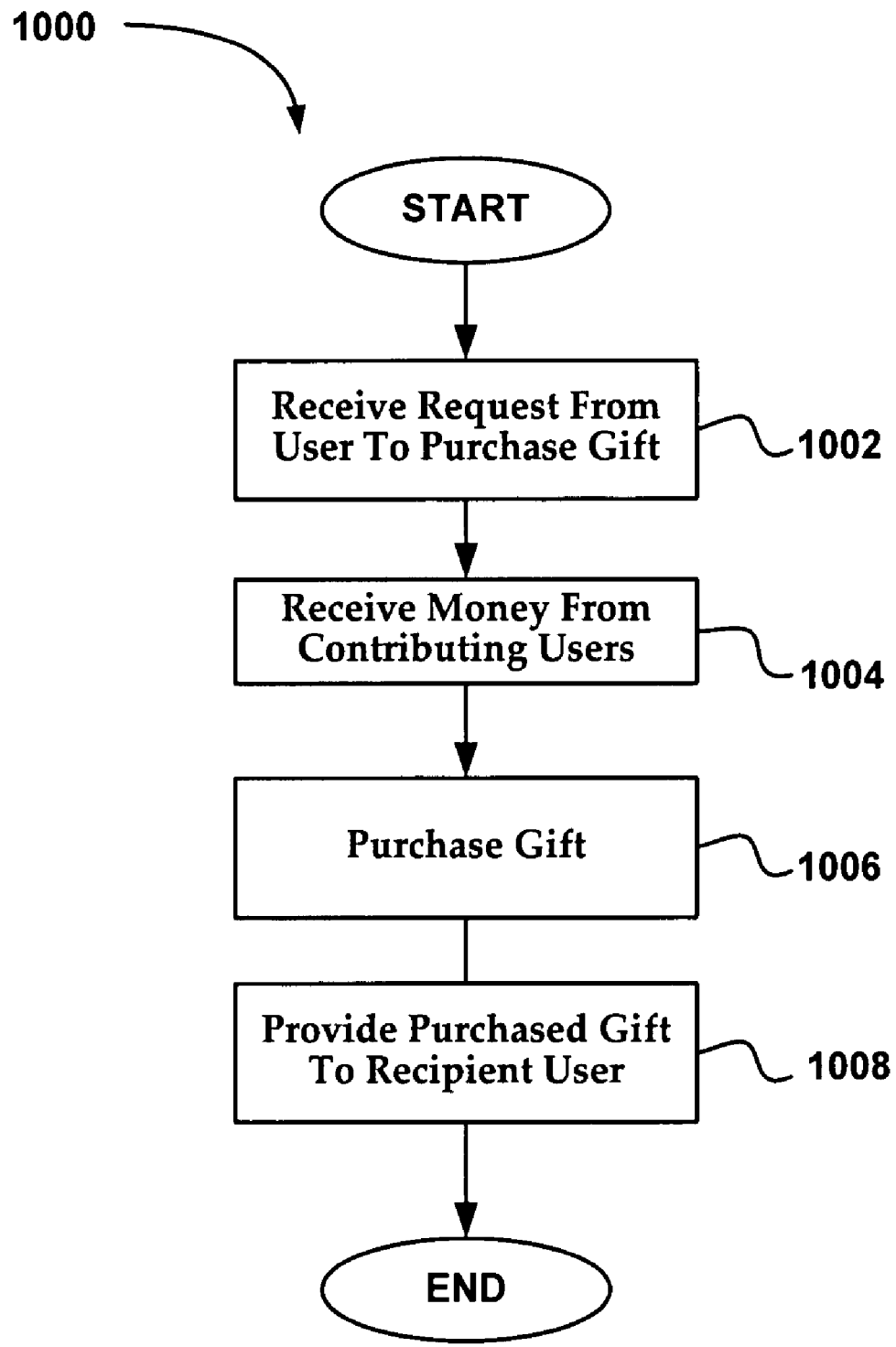
FIG. 10 is a flowchart of an exemplary process for collectively giving a gift in a social network environment.

FIG. 10 is a flowchart of an exemplary process 1000 for collectively giving a gift in a social network environment 100. In step 1002, the social network provider 130 receives a request from a requesting user 102A via the gift module 306 to purchase the gift for a recipient user 102B. In step 1004, the social network provider 130 receives money via the gift module 306 from a plurality of contributing users 102C. The money may be stored in the collective gift fund 312. In step 1006, the social network provider 130 facilitates the purchase of the gift with money in the collective gift fund 312. In step 1008, the social network provider 130 provides the purchased gift to the recipient user.

Figure 11:
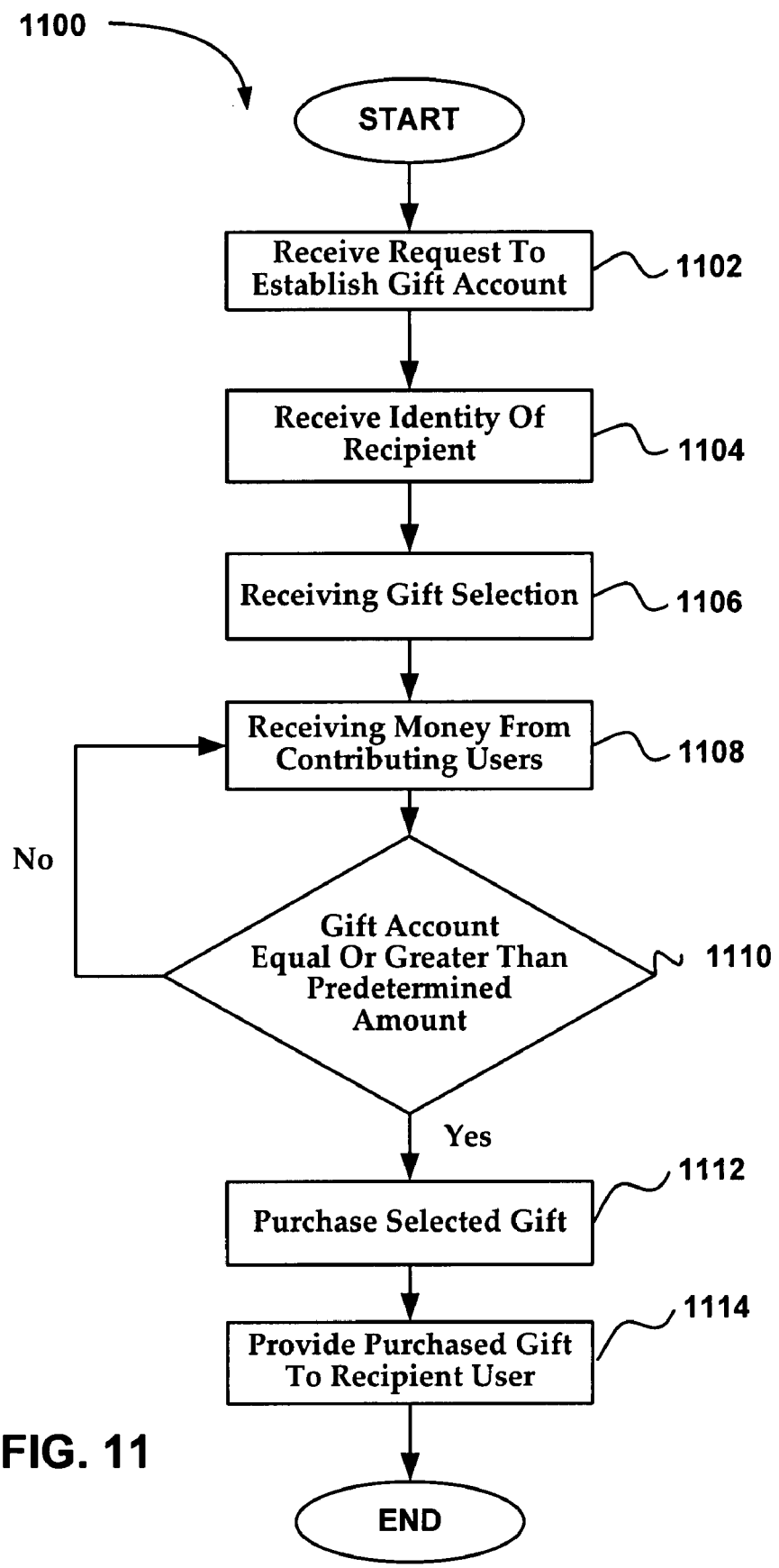
FIG. 11 is a flowchart of another exemplary process for collectively purchasing a gift in a social network environment.

FIG. 11 is a flowchart of another exemplary process 1100 for collectively purchasing a gift in a social network environment 100. In step 1102, the social network provider 130 receives a request from a requesting user 102A via the gift module 306 to establish a gift account, e.g., collective gift fund 312, for purchase of a gift. In step 1104, the social network provider 130 receives an identity of a recipient user 102B. In step 1106, the social network provider receives a selection of the gift. In step 1108, the social network provider 130 receives money via the gift module 306 from a plurality of contributing users 102C. The money may be stored in the collective gift fund 312. The contributing users 102C may include the requesting user 102A. In optional step 1110, the social network determines if the amount in the collective gift fund 312 is less than a predetermined amount. If the amount is less than a predetermined amount, the method returns to step 1108 and continues to receive money. If the amount has reached the predetermined amount, the method continues to step 1112. In step 1112, the social network provider 130 facilitates the purchase of the selected gift with money in the collective gift fund 312. In step 1114, the social network provider 130 provides the purchased gift to the recipient user.

Alternatively, the social network provider may set a predetermined time for collecting money. In this case, it is determined in step 1110 if time remains for receiving money. If time remains then the method returns to step 1108. If the predetermined time has expired then the method continues to step 1112.

Figure 12:
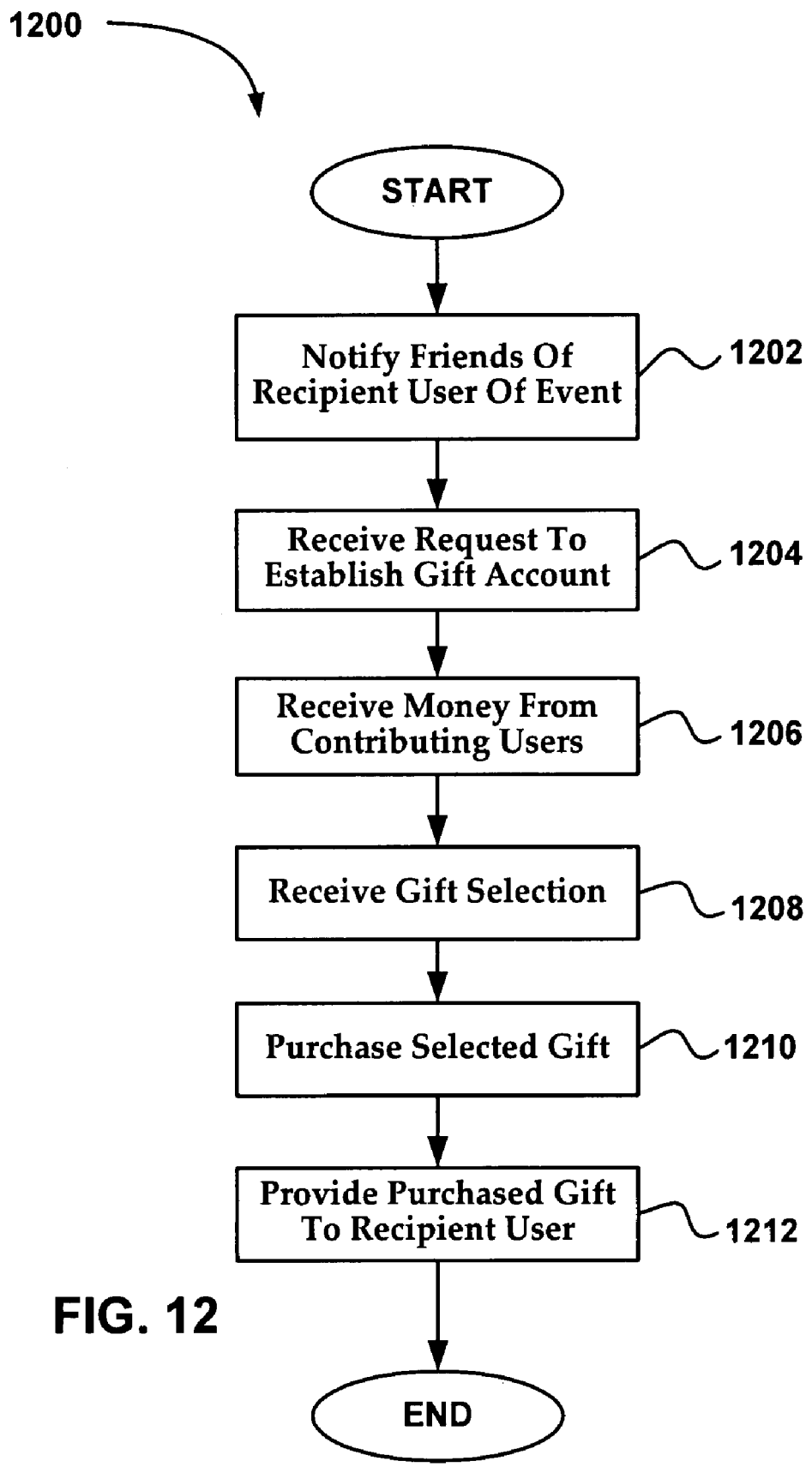
FIG. 12 is a flowchart of another exemplary process for collectively giving a gift in a social network environment.

FIG. 12 is a flowchart of another exemplary process 1200 for collectively giving a gift in a social network environment 100. In step 1202, the social network provider 130 notifies friends of a user 102B of an event, such as the birthday or anniversary of the user 102B. In step 1204, the social network provider receives a request from a requesting user 102A via the gift module 306 to establish a collective gift fund 312 for purchase of a gift for the user 102B. In step 1206, the social network provider 130 receives money via the gift module 306 from a plurality of contributing users 102C. The money may be stored in the collective gift fund 312. In step 1208, the social network provider receives a selection of the gift. In step 1210, the social network provider 130 facilitates purchase of the selected gift with money in the collective gift fund 312. In step 1212, the social network provider 130 provides the purchased gift to the recipient user.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for collectively giving a gift in a social network environment, the method comprising:
  receiving, at a collective gift engine, a request from a requesting user of the social network environment to receive a respective contribution value for purchasing the gift for a recipient user of the social network environment; wherein the request does not identify the gift to be purchased;
  receiving, at the collective gift engine, the respective contribution value from each contributing user of a plurality of contributing users of the social network environment for purchasing the gift;
  determining, by the collective gift engine, a sum of the respective contribution values received from the contributing users;
  identifying, by the collective gift engine, a list of assets costing less than or equal to the determined sum;
  providing the list of assets to one or more of the contributing users;
  receiving a selection of an asset from the provided list of assets;
  deducting, from a social network account associated with each of the contributing users, the respective contribution values; and
  facilitating the purchase of the selected asset as the gift for the recipient user from a vendor using the received contribution values.

2. The method of claim 1, wherein the requesting user is also a contributing user.

3. The method of claim 1, further comprising:
  receiving votes from the contributing users for an asset from the list of assets to be selected as the gift from the plurality of contributing users; and
  selecting the gift based on the received votes.

4. The method of claim 3, wherein information regarding the votes is collected and sold to an interested party.

5. The method of claim 3, wherein the list of assets is based on an affinity of the recipient user for the one or more assets.

6. The method of claim 3, wherein selecting the gift further comprises selecting the asset for which the most votes were received.

7. The method of claim 1, wherein receiving a respective contribution value from each contributing user further comprises
  receiving contribution values until the sum of the respective contribution values received from all the contributing users reaches a predetermined amount.

8. The method of claim 7, wherein purchasing the asset from the list of assets comprises purchasing the asset when the sum of the respective contribution values received from all the contributing users is greater than or equal to the predetermined amount.

9. The method of claim 1, wherein receiving the respective contribution value from each contributing user further comprises receiving the respective contribution values for a predetermined period of time.

10. The method of claim 1, wherein the purchased asset comprises a digital asset.

11. The method of claim 1, wherein the purchased asset is provided to the recipient user on a predetermined date.

12. The method of claim 1, wherein the purchased asset is provided to the recipient user at a predetermined time of day.

13. The method of claim 1, wherein the purchased asset is a real asset, and wherein the method further comprising displaying an icon representative of the purchased asset on a webpage in the social network environment associated with the recipient user.

14. The method of claim 13, wherein the purchased asset comprises the icon.

15. A method for collectively giving a gift in a social network environment, the method comprising:
  receiving, at a collective gift engine, a request to establish a gift account; wherein the request does not identify the gift to be purchased;
  receiving, at the collective gift engine, the identity of a user of the social network environment who is to receive the gift;
  receiving, at the collective gift engine, a respective contribution value from each contributing user of a plurality of contributing users for deposit into the gift account;
  determining, by the collective gift engine, a sum of the respective contribution values received from the contributing users;
  identifying, by the collective gift engine, a list of assets costing less than or equal to the determined sum;
  providing the list of assets to one or more of the contributing users;
  receiving a selection of an asset from the provided list of assets;
  deducting, from a social network account associated with each of the contributing users, the respective contribution values; and
  facilitating the purchase of the selected asset as the gift for the recipient user from using the contribution values deposited in the gift account.

16. The method of claim 15, wherein purchasing the asset from the list of assets comprises purchasing the asset when the sum of the respective contribution values in the gift account is equal to or greater than a predetermined amount.

17. The method of claim 15, further comprising displaying the sum of the respective contribution values in the gift account to one or more of the plurality of contributing users.

18. The method of claim 15, further comprising calculating a suggested contribution for a contributing user and communicating the amount of the suggested contribution to the contributing user.

19. The method of claim 15, further comprising displaying the sum of the respective contribution values contributed to the gift account to the plurality of contributing users.

20. The method of claim 15, further comprising displaying a list of one or more of the plurality of contributing users on a gift web page associated with the recipient user.

21. The method of claim 15, further comprising displaying the identity of one or more of the plurality of contributing users to the recipient user.

22. The method of claim 15, further comprising displaying the respective contribution value received from a contributing user only when permitted by the contributing user.

23. The method of claim 15, further comprising displaying the identity of a contributing user only when permitted by the contributing user.

24. A method for collectively giving a gift in a social network environment, the method comprising:
  notifying a plurality of friends of a user in a social network environment of an event associated with the user;
  receiving, at a collective gift engine, a request to establish a gift account from one of the notified friends; wherein the request does not identify the gift to be purchased;

receiving, at the collective gift engine, a respective contribution value from each contributing user of a plurality of contributing users for deposit into the gift account;

determining, by the collective gift engine, a sum of the respective contribution values received from the contributing users;

identifying, by the collective gift engine, a list of assets costing less than or equal to the determined sum;

providing the list of assets to one or more of the contributing users;

receiving a selection of an asset from the provided list of assets;

deducting, from a social network account associated with each of the contributing users, the respective contribution values; and facilitating the purchase of the selected asset as the gift for the user using the contributions values deposited in the gift account.

25. The method of claim 24, wherein the event is a birthday, an anniversary, a wedding, or a retirement, of the user.

26. The method of claim 24, further comprising receiving a request from the user to notify one or more friends of the user.

* * * * *